US011480334B2

(12) United States Patent
Hokanson

(10) Patent No.: US 11,480,334 B2
(45) Date of Patent: *Oct. 25, 2022

(54) INTEGRATED DAMPER CONTROL SYSTEM

(71) Applicant: FIELD CONTROLS, L.L.C., Kinston, NC (US)

(72) Inventor: Eric A. Hokanson, Kinston, NC (US)

(73) Assignee: Field Controls, LLC, Kinston, NC (US)

( * ) Notice: Subject to any disclaimer, the term of this patent is extended or adjusted under 35 U.S.C. 154(b) by 833 days.

This patent is subject to a terminal disclaimer.

(21) Appl. No.: 16/363,016

(22) Filed: Mar. 25, 2019

(65) Prior Publication Data

US 2019/0219262 A1    Jul. 18, 2019

Related U.S. Application Data

(63) Continuation of application No. 13/458,163, filed on Apr. 27, 2012, now Pat. No. 10,240,787.

(60) Provisional application No. 61/481,921, filed on May 3, 2011.

(51) Int. Cl.
| G05D 23/19 | (2006.01) |
| F23L 13/02 | (2006.01) |
| F23N 3/04  | (2006.01) |
| F23N 5/24  | (2006.01) |

(52) U.S. Cl.
CPC .............. *F23L 13/02* (2013.01); *F23N 3/042* (2013.01); *F23N 5/242* (2013.01); *G05D 23/1917* (2013.01); *F23N 2231/28* (2020.01); *F23N 2235/04* (2020.01)

(58) Field of Classification Search
CPC .......... F23L 13/02; F23N 3/042; F23N 5/242; G05D 23/1917
USPC ........................................................ 700/282
See application file for complete search history.

(56) References Cited

U.S. PATENT DOCUMENTS

| 2,085,912 A | 7/1937 | Lencke |
| 3,580,238 A | 5/1971 | Diehl |
| 4,046,318 A | 9/1977 | Ripley |
| 4,123,796 A | 10/1978 | Shih |
| 4,143,811 A | 3/1979 | Sattmann |
| 4,239,477 A | 12/1980 | Hayes |
| 4,254,759 A | 3/1981 | Schmidt |
| 4,265,394 A | 5/1981 | Nagel |
| 4,267,965 A | 5/1981 | Everett |

(Continued)

*Primary Examiner* — Jigneshkumar C Patel
(74) *Attorney, Agent, or Firm* — Crowell & Moring LLP

(57) ABSTRACT

A damper control device may include an appliance control programmed processor for controlling a gas burner, the appliance control programmed processor including a lockout register for storing electronic data information, and a damper control programmed processor for controlling a damper, the damper control programmed processor including a damper request register for storing electronic data information. The damper control programmed processor may be configured for selectively opening or closing the damper responsive to status of the damper request register and controlling status of the lockout register to indicate status of the damper, and the appliance control programmed processor may be configured for controlling status of the damper request register responsive to a call for operation of the gas burner and operating the gas burner only if the lockout register is in an unlock status.

20 Claims, 4 Drawing Sheets

(56) References Cited

U.S. PATENT DOCUMENTS

| | | | |
|---|---|---|---|
| RE31,256 E | 5/1983 | Schmidt | |
| 4,401,425 A | 8/1983 | Gable et al. | |
| 4,439,139 A | 3/1984 | Nelson et al. | |
| 4,479,604 A | 10/1984 | Didner | |
| 4,619,602 A | 10/1986 | Grant | |
| 4,751,912 A | 6/1988 | Monette | |
| 4,920,866 A | 5/1990 | Hoban | |
| 5,034,671 A | 7/1991 | Patton et al. | |
| 5,082,173 A | 1/1992 | Poehlman et al. | |
| 5,423,479 A | 6/1995 | Nichols | |
| 5,503,550 A | 4/1996 | DePalma | |
| 5,531,214 A | 7/1996 | Cheek | |
| 5,555,876 A | 9/1996 | Francisco, Jr. et al. | |
| 5,567,143 A | 10/1996 | Servidio | |
| 5,881,806 A | 3/1999 | Rudd | |
| D409,073 S | 5/1999 | Bluestone | |
| 6,035,849 A | 3/2000 | Bluestone | |
| 6,082,704 A | 7/2000 | Grinbergs | |
| 6,108,614 A | 8/2000 | Lincoln et al. | |
| 6,208,263 B1 | 3/2001 | Strand | |
| 6,227,961 B1 | 5/2001 | Moore et al. | |
| 6,254,008 B1 | 7/2001 | Erickson et al. | |
| 6,257,871 B1 | 7/2001 | Weiss et al. | |
| 6,261,087 B1 | 7/2001 | Bird et al. | |
| 6,373,376 B1 | 4/2002 | Adams et al. | |
| 6,409,143 B1 | 6/2002 | Beck et al. | |
| 6,431,268 B1 | 8/2002 | Rudd | |
| 6,448,901 B1 | 9/2002 | Adams et al. | |
| 6,557,501 B2 | 5/2003 | Hughes | |
| 6,595,430 B1 | 7/2003 | Shah | |
| 6,644,957 B2 | 11/2003 | Weiss | |
| 6,745,724 B2 | 6/2004 | Hughes et al. | |
| 6,749,124 B2 | 6/2004 | Weiss | |
| 6,749,125 B1 | 6/2004 | Carson et al. | |
| 6,855,050 B2 | 2/2005 | Gagnon et al. | |
| 6,879,239 B2 | 4/2005 | McCarren | |
| 6,915,799 B2 | 7/2005 | Weiss | |
| 6,993,417 B2 | 1/2006 | Osann, Jr. | |
| 7,181,317 B2 | 2/2007 | Amundson et al. | |
| D546,435 S | 7/2007 | Guzorek | |
| 7,250,870 B1 | 7/2007 | Viner et al. | |
| 7,258,280 B2 | 8/2007 | Wolfson | |
| 7,290,981 B2 | 11/2007 | Guzorek | |
| D562,261 S | 2/2008 | Takach et al. | |
| D562,262 S | 2/2008 | Takach et al. | |
| D563,325 S | 3/2008 | Takach et al. | |
| D570,791 S | 6/2008 | Takach et al. | |
| D579,096 S | 10/2008 | Guzorek | |
| 7,451,759 B2 | 11/2008 | Weiss et al. | |
| 7,496,627 B2 | 2/2009 | Moorer et al. | |
| 7,584,897 B2 | 9/2009 | Schultz et al. | |
| 7,721,972 B2 | 5/2010 | Bracken et al. | |
| 8,113,823 B2 | 2/2012 | Guzorek | |
| 8,297,524 B2 | 10/2012 | Kucera et al. | |
| 8,396,604 B2 | 3/2013 | Imes et al. | |
| 2005/0040250 A1 | 2/2005 | Wruck | |
| 2005/0066958 A1* | 3/2005 | Guzorek | F23N 3/047 126/285 R |
| 2005/0125083 A1 | 6/2005 | Kiko | |
| 2006/0204911 A1 | 9/2006 | Teng | |
| 2010/0012048 A1 | 1/2010 | Whitford et al. | |
| 2011/0046792 A1 | 2/2011 | Imes et al. | |
| 2011/0114034 A1* | 5/2011 | Aycock | F23L 11/005 122/14.2 |
| 2013/0040252 A1 | 2/2013 | Bronson et al. | |
| 2013/0048743 A1 | 2/2013 | Kucera et al. | |
| 2014/0154635 A1 | 6/2014 | Scott et al. | |

* cited by examiner

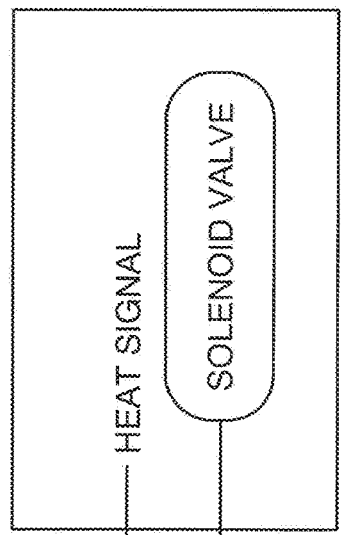
Fig. 1 (Prior Art)
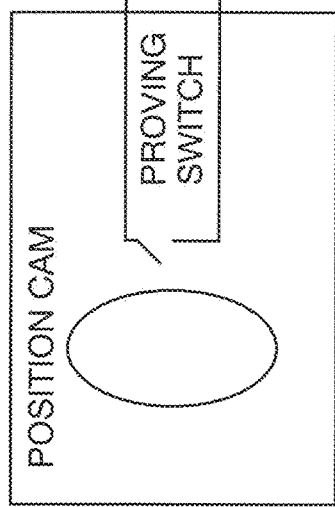
Fig. 3
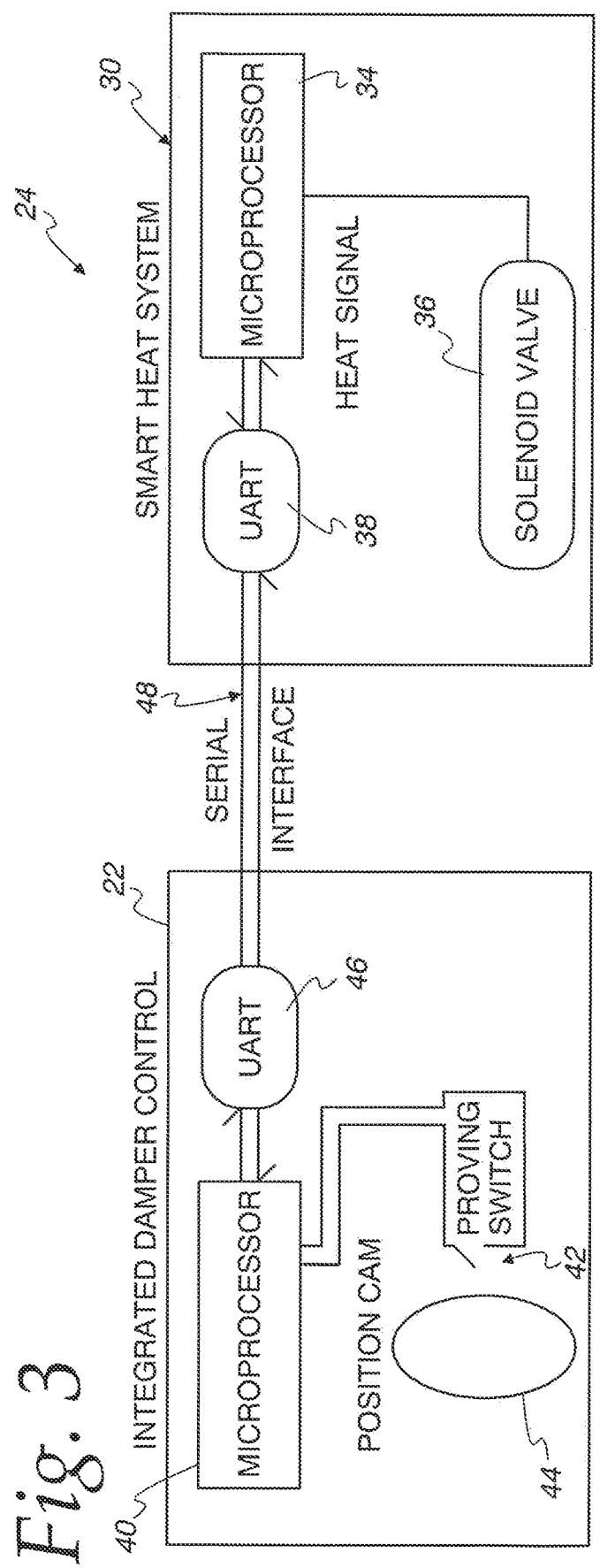

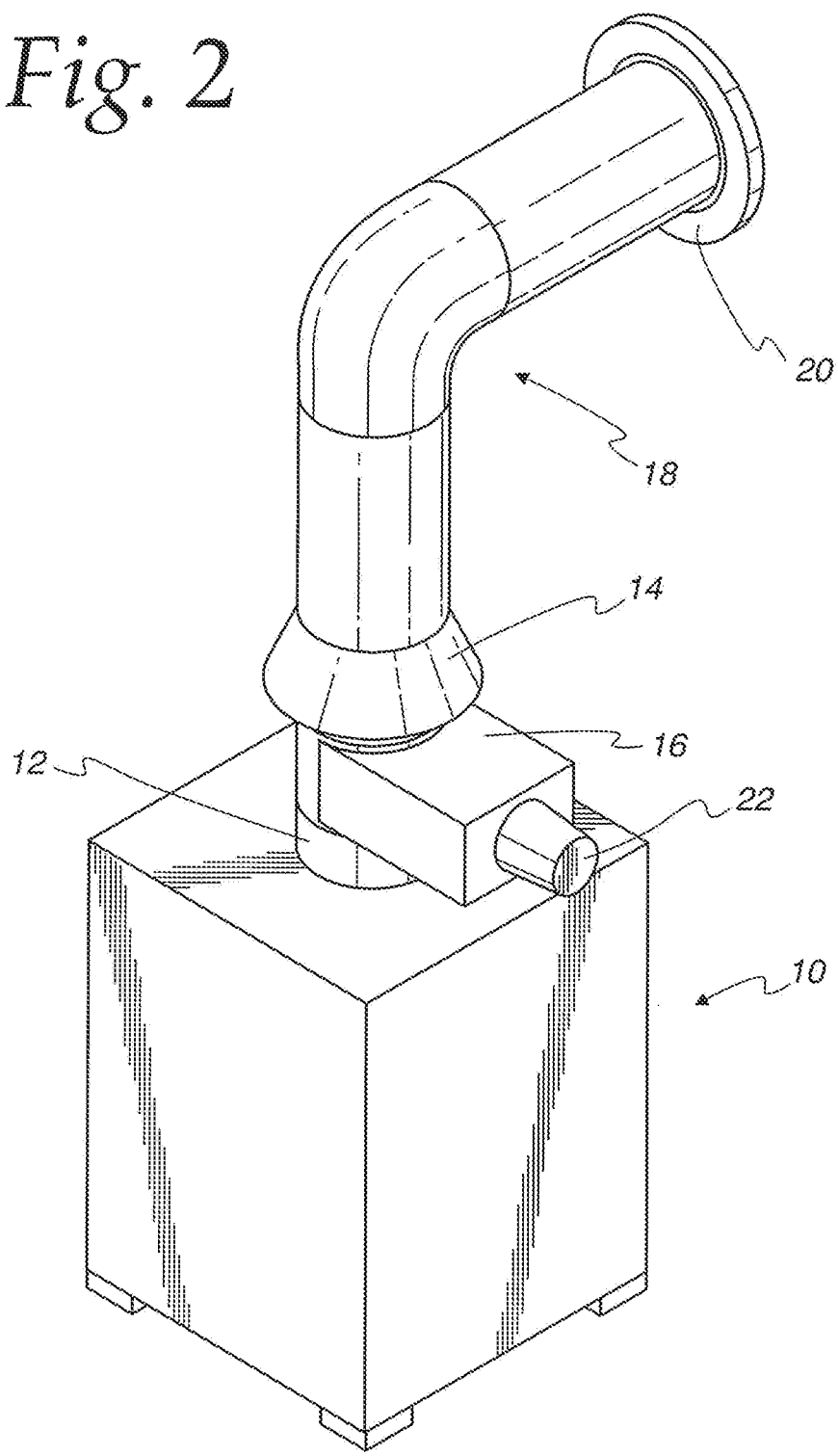

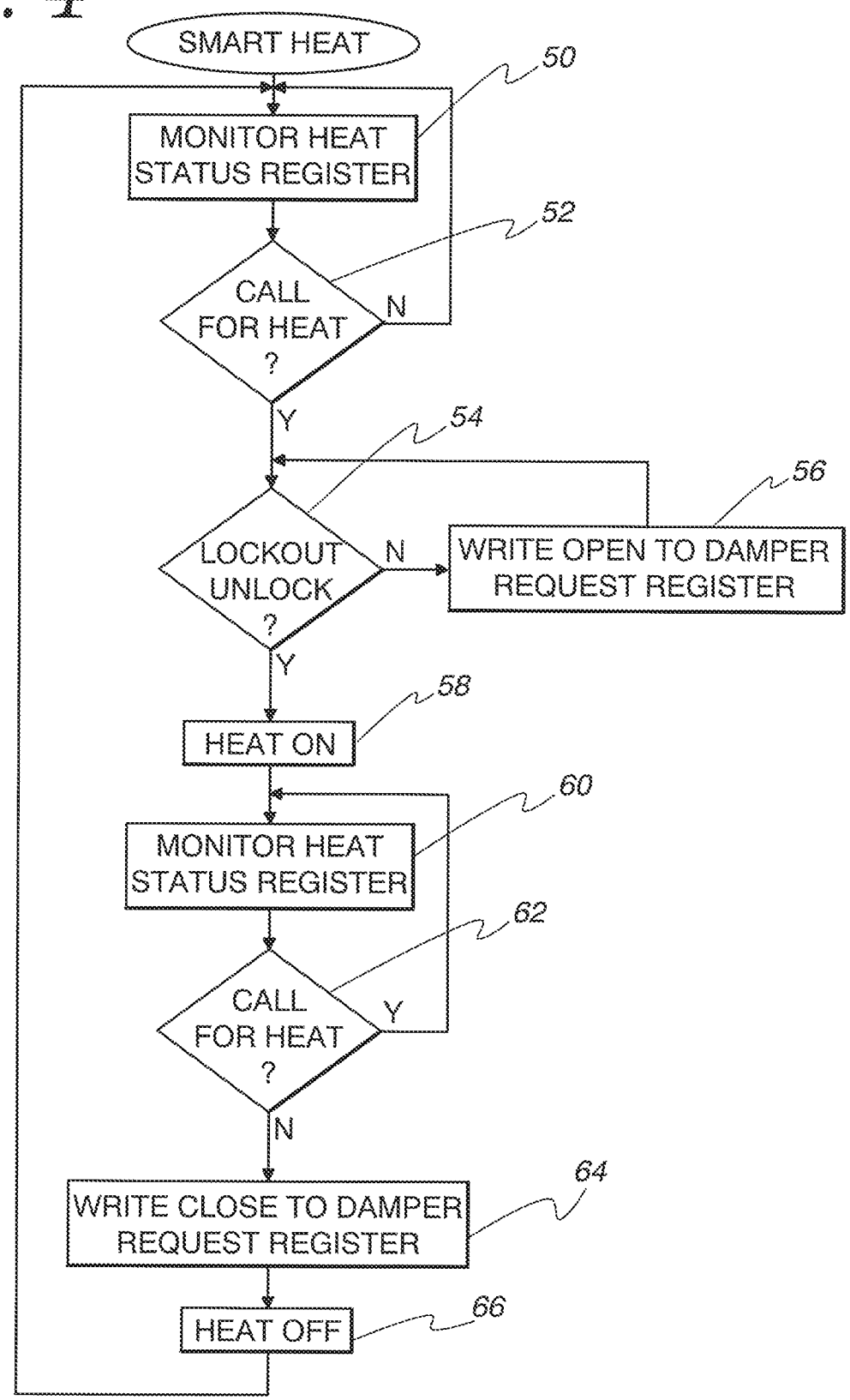

INTEGRATED DAMPER CONTROL SYSTEM

CROSS-REFERENCE TO RELATED APPLICATIONS

This application is a continuation of U.S. patent application Ser. No. 13/458,163, filed Apr. 27, 2012, which claims the benefit of U.S. Provisional Application No. 61/481,921, filed May 3, 2011. Each of the applications is hereby incorporated by reference in its entirety.

FIELD OF THE INVENTION

This invention relates to gas fired appliances and, more particularly, to an integrated damper control system for use with a gas fired appliance.

BACKGROUND

A typical gas fired appliance, such as a. boiler, includes a gas burner for generating heat. For example, with a boiler the burner is used for heating water. The appliance typically includes a draft hood or diverter. A vent from the draft hood exhausts products of combustion from the appliance. The vent may include a flue damper.

The typical known analog damper control system has proven to be a safe and reliable accessory for fuel fired appliances such as water heaters, furnaces, and boilers. For simplicity, the terms "heat system" and "appliance" are a reference to "fuel fired appliance". A simple heat system is defined as a fuel fired appliance that has analog inputs and outputs for use with a damper system to control the fuel delivery solenoid valve. A smart heat system is defined as a fuel fired appliance that does not have analog inputs and outputs for use with a damper control system.

The analog damper control improves the overall efficiency of a simple heating system by closing the flue when the heat system is idle. The analog damper control incorporates a proving circuit that prevents heat activity of the appliance when the damper gate is not in the open position. The proving circuit in simplistic terms may include a positioning cam or lever attached to a mechanical switch that would electrically connect or disconnect the heat control signal to the "fuel delivery" solenoid valve in relationship to the damper gate position. A heat call by the appliance would initiate the damper control to open the damper gate. When the damper gate is in the open position, the proving switch will be in the closed position to allow current flow from the appliance to the "fuel delivery" solenoid valve. The proving circuit is a safety switch that would prevent release and firing of fossil fuel when the damper is not fully open. A typical damper control system is shown in the diagram of FIG. 1.

More recently, fuel fired appliances have become more complex in design. Introduction of new technology has evolved the simple heat system to a modern smart heat system. Many of the smart heat systems do not have provisions for the simple analog damper control. Analog control signals have been replaced by a serial network interface to transfer data from the smart heat system to accessory components such as a damper control system.

One known method that can be used to implement an integrated damper control with a smart heat system is to operate the damper as a heat anticipator. Data that is transferred between the smart heat system and accessory component could include; set point, temperature, heat activity data, remote set point, and operating differential. The integrated damper control reads data from the smart heat system through the serial interface to determine when to open or close the damper gate. The operating temperature, set point and differential will be used to calculate the operating point or anticipated heat turn on temperature. The anticipated value will predict when heating will occur. The heat activity or "heating status" of the smart heat system will also be monitored. When the temperature is close to the anticipated value, the integrated damper control will send a. low set point data instruction to the smart heat system to suspend any heat call activity while the damper is transitioning to the open. position. Once the damper has verified the damper gate is open, the original set point will be transmitted to the smart heat system to allow for heating to occur. In the event the smart heat system activates the fuel solenoid valve while the damper is closed, the integrated damper control will momentarily suppress the operating set point of the smart heat system through the serial interface to deactivate the heat call. The integrated damper will open the damper gate and then restore the smart heat system's set point to allow the heat call to commence. The "heating status" register will be monitored during the heat call to determine when the heat call has been satisfied. Once the heat call terminates, the damper will be closed.

There are issues with the heat anticipation method such that it is possible for the smart heat system to activate the fuel delivery solenoid while the damper gate is in the closed position, which is not permitted by the safety standards covering fuel fired appliances.

This application is directed to improvements in damper control systems.

SUMMARY

As disclosed herein, an integrated damper control system interfaces a damper control to an appliance control through a network interface.

There is disclosed in accordance with one aspect of the invention a damper control system for use with a gas fired appliance including a gas burner, a flue and a damper for selectively opening the flue. The damper control system comprises an appliance control including a programmed processor for controlling the gas burner and a communication interface device. A damper control comprises a programmed processor for controlling the damper and a communication interface device for communication with the appliance control communication interface device. The damper control programmed processor is programmed to selectively open or close the damper responsive to status of a damper request register and to control status of a lockout register to indicate status of the damper. The appliance control programmed processor is programmed to control status of the damper request register responsive to a call for operation of the gas burner and to operate the gas burner only if the lockout register is set to unlock.

It is a feature that the communication interface devices comprise UART circuits to implement the serial interface.

It is another feature that the communication interface devices may comprise wireless devices.

It is a further feature of the invention that the appliance control programmed processor waits for the lockout register to be set to unlock after a call for operation of the gas burner.

It is still another feature that the appliance control programmed processor writes an open status to the damper request register responsive to a call for operation of the gas burner and writes a close status to the damper request register responsive to termination of a call for operation of the gas burner.

It is still another feature that the damper control programmed processor sets the lockout register to lock responsive to the damper being commanded to close and sets the lockout register to unlock responsive to the damper being open. The damper control programmed processor may verify the status of the lockout register before closing the damper.

It is yet another feature that the damper control programmed processor terminates the call for operation of the gas burner in the absence of a request to open the damper after the call for operation of the gas burner. The damper control programmed processor may lower a temperature set point of the appliance control programmed processor to effectively terminate the call for operation of the gas burner.

It is still a further feature that the damper control programmed processor is programmed to open the damper responsive to a high temperature condition indicated in the appliance control programmed processor.

There is also disclosed in accordance with another aspect of the invention a method of controlling a damper used with a gas fired appliance including a gas burner and a flue, the damper for selectively opening the flue, the method comprising providing an appliance control programmed processor for controlling the gas burner; providing a damper control programmed processor for controlling the damper; providing communications between the appliance control programmed processor and the damper control programmed processor; and the damper control programmed processor selectively opening or closing the damper responsive to status of a damper request register and controlling status of a lockout register to indicate status of the damper, and the appliance control programmed processor controlling status of the damper request register responsive to a call for operation of the gas burner and operating the gas burner only if the lockout register is in an unlock status.

Other features and advantages will be apparent from a review of the entire specification, including the appended claims and drawings.

BRIEF DESCRIPTION OF THE DRAWINGS

FIG. 1 is a block diagram of a prior art analog vent proving system;

FIG. 2 is a perspective view of a damper control system in accordance with the invention mounted to a gas fired appliance;

FIG. 3 is a block diagram of the damper control system of FIG. 2;

FIG. 4 is a flow diagram illustrating a program implemented in the heat system microprocessor of FIG. 3.

DETAILED DESCRIPTION

Figure 5:
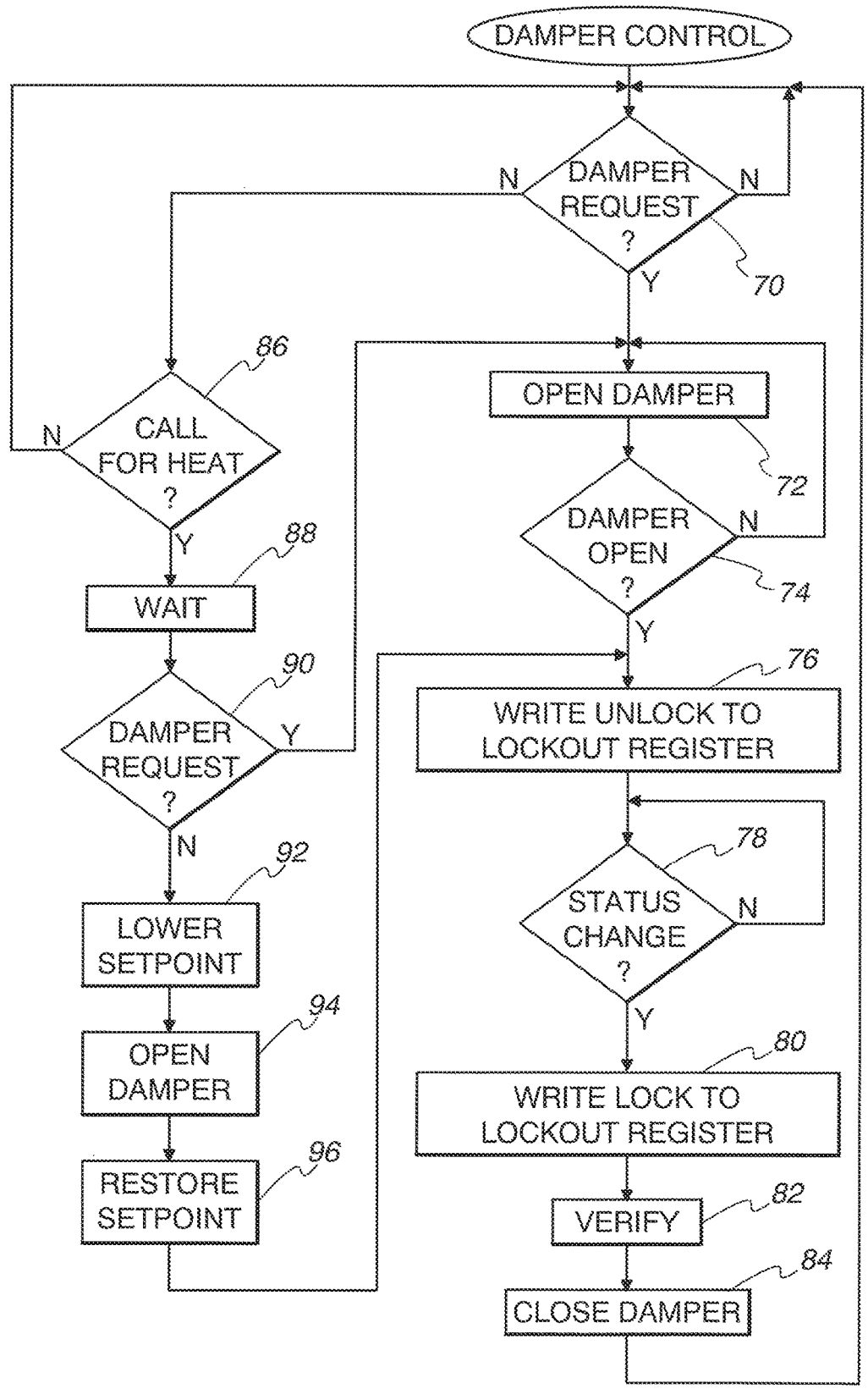
FIG. 5 is a flow diagram illustrating a program implemented in the damper control microprocessor of FIG. 3.

The integrated damper control system disclosed herein identifies functions and methods to interface a damper control to an appliance control, such as a smart heat system, through a serial network interface.

The integrated damper control system performs the same basic function as an analog damper control system. However, the proving circuit is isolated from the smart heat system and not directly connected to the fuel delivery solenoid. The damper gate position is monitored by the integrated damper control by use of a motorized cam and position switches that indicate to a microprocessor the open or closed state of the gate. The serial interface of the smart heat system is used to transmit and receive data to the integrated damper control.

A safe and reliable method to operate an integrated damper control with a smart heat system control incorporates a direct register control that permits or prevents the fuel delivery solenoid activity in relation to the damper gate position.

The direct register control method requires two control registers that are internal to the smart heat system. One control register defined as "damper request" will be written by the smart heat system to indicate a request to open and to indicate a request to close the damper. The "damper request" register will be monitored by the integrated damper control once per second. The second control register defined as "lockout" can only be written to by the integrated damper control. The "lockout" register can only be read by the smart heat system to determine if heating is permitted or prohibited.

Referring to FIG. 2, a gas fired appliance 10 of conventional construction is illustrated. The gas fired appliance 10 may comprise, for example, a boiler. For simplicity herein, the gas fired appliance 10 will be referred to as a boiler, it being understood that the invention is not limited to use in connection with a boiler. The boiler 10 includes a flue 12 and a flue damper 16 connected to a draft hood 14. The draft hood 14 is in turn connected to a vent pipe or stack 18 through a wall opening 20 to exhaust products of combustion from the boiler 10 to the exterior of the building. Again, for simplicity herein, the ducts and/or pipes used in venting from the boiler 10 will be referred to as a "vent". The internal pipe of the boiler 10 which is attached to the flue damper control shall be referred to as a "flue". The present invention is not directed to any particular gas fired appliance or configuration of the venting system. In accordance with the invention, a damper control 22 is operatively associated with the flue damper 16.

The flue damper 16 may be of conventional construction such as illustrated in U.S. Publication No. 2011/0114034, owned by the assignee of the present application, the specification of which is incorporated by reference herein. The flue damper 16 includes a gate controlled by a motor, not shown herein, to selectively open or close the flue 12, as is conventional.

Referring to FIG. 3, the damper control 22 communicates with an appliance control 30 to form a damper control system 24. The appliance control 30 in one form comprises a smart heat system and comprises a programmed processor, such as the microprocessor 34 and associated memory, for controlling a solenoid valve 36 associated with a gas burner. A UART communication device 38 is operatively connected to the microprocessor 34. As will be apparent, the appliance control 30 may include a thermostat and the like and is programmed to control the overall operation of the gas fired appliance 10. Typically, the microprocessor 34 uses a programmable set point and thermostat. If the temperature is above the set point, then the solenoid valve 36 is off. If the measured temperature is below the set point, then the microprocessor 34 turns on the solenoid valve 36 to ignite the gas burner. As will be apparent, there may be other associated devices according to the design of the particular gas fired appliance. This application is not directed to those features of the appliance control, but rather the interaction with the damper control 22, as described below.

The damper control 22 comprises a programmed processor, such as a microprocessor 40 and associated memory operatively connected to a proving switch 42. The proving switch 42 senses position of a position cam 44. The position cam 44 is associated with the flue damper gate 16 and is rotational therewith. The proving switch 42 is selectively opened or closed dependent on whether the flue damper 16 is closed or open, as is known. The microprocessor 40 is in operative communication with a UART communication device 46 and communicates via a serial interface 48 to the appliance control UART 38. The serial interface may use any form of communication, such as RS-232, RS-485, IRDA, I2C or SPI. The communication may also use a wireless network or other data exchange methods, as necessary or desired.

Referring to FIG. 4, a flow diagram illustrates a smart heat program implemented in the appliance control microprocessor 34 of FIG. 3. As noted above, the appliance control 30 performs various other functions not described in detail herein. The program begins at a block 50 which monitors a heat status register. The heat status register indicates whether there is a call for heat such as based on the need to satisfy a temperature demand, or the like. A decision block 52 determines whether or not there is a call for heat. If not, the program moves back to the block 50 until there is a call for heat. Once there is a call for heat, then a decision block 54 determines whether or not a lockout register is set to "unlock". The lockout register is controlled by the damper control microprocessor 40 over the serial interface 48. If not, then a block 56 writes an open status to the damper request register. The program waits until the lockout register is changed to unlock. Once this occurs, then heat is turned on at a block 58 as by providing a heat signal to the solenoid valve 36 to ignite the gas burner.

Once the heat is on, then the program monitors the heat status register at a block 60 and a block 62 determines if there is still a call for heat. If so, then the program loops back to the block 60. Once the call for heat has been removed, then the program writes a close status to the damper request register at a block 64 and the heat signal to the solenoid valve 36 is turned off at a block 66. The program then returns to the block 50.

Referring to FIG. 5, a flow diagram illustrates operation of a program implemented in the damper control microprocessor 40 of FIG. 3. The program continually monitors the damper request register at a decision block 70. Once the damper request register has been changed to open, then a block 72 opens the damper by appropriately energizing the damper motor. A decision block 74 determines if the damper is open, as indicated by the status of the proving switch 42.

If not, then the program loops back to the block 72. Once the damper is open, then the program sets the lockout register to unlock at a block 76.

A decision block 78 monitors to see if there is any status change such as if the heat call is terminated. This can be done by reading the damper request register and/or monitoring the heat status register. If there is no status change, then the program loops back. If so, then the program sets the lockout register to lock at a block 80. A block 82 verifies that the lockout register has been changed to lock. Thereafter, the damper is closed at a block 84. The program loops back to the block 70.

Optionally, an alternative routine may be used to provide for redundancy. If there is no damper request, as determined at the decision block 70, then a decision block 80 may determine if there is a call for heat. If so, then the system waits at a block 88 and then determines at a decision block 90 if the damper request register has changed. If so, then the program proceeds to the block 72, discussed above. If not, then the program lowers the heat set point at a block 92, opens the damper at a block 94, and subsequently restores the heat step point at a block 96. The program then advances to the block 76.

As is apparent, the appliance control microprocessor 34 and the damper control microprocessor 40 communicate over the serial interface 48 as by reading appropriate registers of one another to provide an integrated system.

Overall operation of the gas fired appliance 10 is now described. In a heating mode, once the smart heat system appliance control 30 determines that heating is required to maintain operating temperature, the following events will take place.

The appliance control 30 reads the lockout register to verify if heating can take place. If the lockout register contains the unlock code, heating may commence without delay. The heat status register is set to indicate heating is active. If the lockout register contains the lock code, heating will be prohibited until the integrated damper control 22 writes to this register the unlock code. The smart heat system will write to the damper request register the request to open code The integrated damper control 22 monitors the damper request register once per second. In the event the damper request register has the request to open code, the integrated damper control 22 will open the damper 16. When the damper gate has been verified it is open, the integrated damper control 22 sends a write command to the appliance control 30 with the unlock code.

During the heat call, the integrated damper control 22 monitors the system heat status register to determine when the heat call has terminated. The damper request register is also monitored for a request to close the damper. The integrated damper control 22 sends a write command and the lock code to the lockout register immediately after it has been determined that the heat call has ended by reading the heat status register or by a request to close code is present in the damper request register.

Once the integrated damper control 22 has issued the lock code to the lockout register, it will be read back from the appliance control 30 to verify it is set prior to closing the damper gate. Once the correct value of the lockout register has been verified, the integrated damper control 22 closes the damper and waits for the next call for heat.

The integrated damper control 22 monitors both the damper request register and heat status register to ensure a heat call does not occur while the damper gate is closed.

As a form of redundancy, if for any reason the appliance control 30 activates a heating call without a request to open the damper or if the "lockout" register is set to lock, the integrated damper control 22 forces a low set point condition to the appliance control 30 to in order to terminate the heat call. The integrated damper control 22 opens the damper gate. Once the damper gate has been verified, the original set point is restored to allow the appliance control 30 to operate. This will be considered a recoverable fault condition that will allow the appliance control 30 to operate. As a safety measure, the damper will resume normal operation only if the appliance control 30 disabled heating when the set point was dropped to a minimum value. If the error occurs during the next three heat cycles, the fault will be considered as a non-recoverable failure. A non-recoverable failure will prevent the damper from closing until power is cycled off to reset the integrated damper control.

The integrated damper control 22 can provide additional safety features when used with a self-powered appliance. The self-powered fuel fired appliance consists of a standing pilot and thermoelectric generator to create electrical energy to operate. The damper gate would have a ventilation port to sustain the pilot operation. In the event that the self-powered appliance has been idle for an extended time, it is possible for the water contained within the heated vessel to exceed the safe operating temperature. The integrated damper control 22 can monitor the water temperature by requesting temperature data from the appliance control 30 through the serial interface 48. Once it has been determined that the measured water temperature has surpassed the safe operating point the damper will open to reduce the water temperature by means of convective ventilation. The damper will remain open until water temperature drops below the unsafe water temperature.

The present invention has been described with respect to a program sequence of operation and block diagrams. It will be understood that each step of the sequence and block of the block diagrams can be implemented by computer program instructions. These program instructions may be provided to a processor to produce a machine, such that the instructions which execute on the processor create means for implementing the functions specified in the steps and/or blocks. The computer program instructions may be executed by a processor to cause a series of operational steps to be performed by the processor to produce a computer implemented process such that the instructions which execute on the processor provide steps for implementing the functions specified. Accordingly, the description and illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

I claim:

1. A damper control system, comprising:
an appliance control programmed processor for controlling a gas burner, the appliance control programmed processor including a lockout register for storing electronic data information; and
a damper control programmed processor for controlling a damper, the damper control programmed processor including a damper request register for storing electronic data information,
wherein the damper control programmed processor is configured for selectively opening or closing the damper responsive to status of the damper request register and controlling status of the lockout register to indicate status of the damper, and the appliance control programmed processor is configured for controlling status of the damper request register responsive to a call for operation of the gas burner and operating the gas burner only if the lockout register is in an unlock status.

2. The damper control system of claim 1, wherein communications between the appliance control programmed processor and the damper control programmed processor are included via UART circuits to implement a serial interface.

3. The damper control system of claim 1, wherein communications between the appliance control programmed processor and the damper control programmed processor are formed by wireless communications.

4. The damper control system of claim 1, wherein the appliance control programmed processor waits for the lockout register to be set to unlock after a call for operation of the gas burner.

5. The damper control system of claim 1, wherein the appliance control programmed processor writes an open status to the damper request register responsive to a call for operation of the gas burner and writes a close status to the damper request register responsive to termination of a call for operation of the gas burner.

6. The damper control system of claim 1, wherein the damper control programmed processor terminates the call for operation of the gas burner in the absence of a request to open the damper after the call for operation of the gas burner.

7. The damper control system of claim 6, wherein the damper control programmed processor lowers a temperature set point of the appliance control programmed processor to effectively terminate the call for operation of the gas burner.

8. The damper control system of claim 1, wherein the damper control programmed processor is programmed to open the damper responsive to a high temperature condition indicated in the appliance control programmed processor.

9. A damper control system, comprising:
an appliance control programmed processor for controlling a gas burner, the appliance control programmed processor including a lockout register for storing electronic data information; and
a damper control programmed processor for controlling a damper, the damper control programmed processor including a damper request register for storing electronic data information,
wherein the damper control programmed processor is configured for selectively opening or closing the damper responsive to status of the damper request register and controlling status of the lockout register to indicate status of the damper,
wherein the appliance control programmed processor is configured for controlling status of the damper request register responsive to a call for operation of the gas burner and operating the gas burner only if the lockout register is in an unlock status,
wherein the damper control programmed processor terminates the call for operation of the gas burner in the absence of a request to open the damper after the call for operation of the gas burner, and
wherein the damper control programmed processor lowers a temperature set point of the appliance control programmed processor to effectively terminate the call for operation of the gas burner.

10. The damper control system of claim 9, wherein communications between the appliance control programmed processor and the damper control programmed processor are included via UART circuits to implement a serial interface.

11. The damper control system of claim 9, wherein communications between the appliance control programmed processor and the damper control programmed processor include wireless communications.

12. The damper control system of claim 9, wherein the appliance control programmed processor waits for the lockout register to be set to unlock after a call for operation of the gas burner.

13. The damper control system of claim 9, wherein the appliance control programmed processor writes an open status to the damper request register responsive to a call for operation of the gas burner and writes a close status to the damper request register responsive to termination of a call for operation of the gas burner.

14. The damper control system of claim 9, wherein the damper control programmed processor is programmed to open the damper responsive to a high temperature condition indicated in the appliance control programmed processor.

15. A damper control system, comprising:
- an appliance control programmed processor for controlling a gas burner, the appliance control programmed processor including a lockout register for storing electronic data information;
- a damper control programmed processor for controlling a damper, the damper control programmed processor including a damper request register for storing electronic data information; and
- wherein the damper control programmed processor is configured for selectively opening or closing the damper responsive to status of the damper request register and controlling status of the lockout register to indicate status of the damper,
- wherein the appliance control programmed processor is configured for controlling status of the damper request register responsive to a call for operation of the gas burner and operating the gas burner only if the lockout register is in an unlock status, and
- wherein the damper control programmed processor is programmed to open the damper responsive to a high temperature condition indicated in the appliance control programmed processor.

16. The damper control system of claim 15, wherein communications between the appliance control programmed processor and the damper control programmed processor are included via UART circuits to implement a serial interface.

17. The damper control system of claim 15, wherein communications between the appliance control programmed processor and the damper control programmed processor include wireless communications.

18. The damper control system of claim 15, wherein the appliance control programmed processor waits for the lockout register to be set to unlock after a call for operation of the gas burner.

19. The damper control system of claim 15, wherein the appliance control programmed processor writes an open status to the damper request register responsive to a call for operation of the gas burner and writes a close status to the damper request register responsive to termination of a call for operation of the gas burner.

20. The damper control system of claim 15,
- wherein the damper control programmed processor terminates the call for operation of the gas burner in the absence of a request to open the damper after the call for operation of the gas burner, and
- wherein the damper control programmed processor lowers a temperature set point of the appliance control programmed processor to effectively terminate the call for operation of the gas burner.

* * * * *